United States Patent
Winnard (10) Patent No.: US 9,560,923 B1
(45) Date of Patent: Feb. 7, 2017

(54) MAGNETIC TOOL HOLDER

(71) Applicant: Stanley D Winnard, Dallas, TX (US)

(72) Inventor: Stanley D Winnard, Dallas, TX (US)

( * ) Notice: Subject to any disclaimer, the term of this patent is extended or adjusted under 35 U.S.C. 154(b) by 0 days.

(21) Appl. No.: 14/983,623

(22) Filed: Dec. 30, 2015

(51) Int. Cl.
*A47F 7/00* (2006.01)
*A47F 5/08* (2006.01)
*B25H 3/04* (2006.01)
*F16B 1/00* (2006.01)

(52) U.S. Cl.
CPC .......... *A47F 5/0823* (2013.01); *A47F 7/0021* (2013.01); *B25H 3/04* (2013.01); *F16B 1/00* (2013.01); *F16B 2001/0035* (2013.01); *Y10S 211/01* (2013.01)

(58) Field of Classification Search
CPC ........ A47F 5/0823; A47F 7/0021; B25H 3/04; F16B 1/00; F16B 2001/0035; Y10S 211/01
USPC .......... 211/DIG. 1, 59.1, 70.6; 206/350, 349, 206/372, 373, 495; 248/309.4, 683, 314, 206.5
See application file for complete search history.

(56) References Cited

U.S. PATENT DOCUMENTS

| | | | | | |
|---|---|---|---|---|---|
| 2,955,239 | A | * | 10/1960 | Rouse | E05C 19/16 211/70.6 |
| 3,640,497 | A | * | 2/1972 | Waki | A47F 5/0823 211/59.1 |
| 4,405,108 | A | * | 9/1983 | Muirhead | A47F 5/0823 211/70.6 |
| 4,497,412 | A | * | 2/1985 | Labelle | A47G 21/14 206/350 |
| 4,681,233 | A | * | 7/1987 | Roth | B25H 3/04 211/70.6 |
| 4,753,495 | A | * | 6/1988 | Swink | A47F 5/02 211/163 |
| 4,848,585 | A | * | 7/1989 | Snyder | A45C 11/16 206/315.11 |
| 5,050,745 | A | * | 9/1991 | Sanders | A45C 11/16 206/495 |
| 5,163,566 | A | * | 11/1992 | Hempel | A47K 1/09 211/65 |
| 5,645,177 | A | * | 7/1997 | Lin | B25H 3/04 206/378 |
| 5,820,091 | A | * | 10/1998 | Kutscher | B23Q 3/102 248/220.21 |
| 6,003,685 | A | * | 12/1999 | Malin | A47F 5/0861 211/59.1 |
| 6,070,746 | A | * | 6/2000 | Hu | A47F 5/0823 211/195 |

(Continued)

*Primary Examiner* — Joshua J Michener
*Assistant Examiner* — Devin Barnett
(74) *Attorney, Agent, or Firm* — Peter V. Schroeder; Booth Albanesi Schroeder LLC (57) ABSTRACT

Disclosed is a magnetic tool holder adapted to be used in conjunction with a pegboard. The tool holder comprises two pairs of legs that are adapted to be received within the peg holes such that, each pair is simultaneously slidably movable between a biased engagement position and a disengagement position wherein, the distance between the pair in the engagement position is greater than that of the pair in the disengagement position. Notably, a friction fit is achieved between pegboard and the main legs in the engagement position. The tool holder further comprises a spring-loaded means for causing the at least one pair of main legs to move from the engagement position to the disengagement position and a magnet disposed on top thereof, the magnet about which, tools are magnetically attached thereto.

10 Claims, 9 Drawing Sheets

(56) References Cited

U.S. PATENT DOCUMENTS

| | | | | |
|---|---|---|---|---|
| 6,474,478 B1* | 11/2002 | Huehner | A47F 5/0861 | 211/4 |
| 6,496,094 B2* | 12/2002 | May, III | B25B 11/002 | 211/69 |
| 6,712,225 B2* | 3/2004 | McNeely | B25H 3/003 | 206/378 |
| 6,923,317 B2* | 8/2005 | Coleman, Jr. | B25H 3/003 | 206/350 |
| 7,178,678 B2* | 2/2007 | Mansfield | A47F 5/0861 | 211/59.1 |
| 7,219,808 B2* | 5/2007 | Wright | A47F 5/0815 | 211/13.1 |
| 7,331,473 B2* | 2/2008 | Smith | G02B 6/4452 | 211/26 |
| 7,677,400 B2* | 3/2010 | Bayazit | G02B 6/4452 | 211/26 |
| 8,499,943 B1* | 8/2013 | Neldner | A47J 45/02 | 206/818 |
| 8,540,197 B1* | 9/2013 | Krol, II | A63C 17/0006 | 211/DIG. 1 |
| 8,727,141 B2* | 5/2014 | Akalin | A47K 1/09 | 211/66 |
| 9,318,008 B2* | 4/2016 | Valiulis | A47F 5/0823 | |
| 2004/0188292 A1* | 9/2004 | O'Hair | B25H 5/00 | 206/349 |
| 2004/0256335 A1* | 12/2004 | Sholem | B25H 3/04 | 211/70.6 |
| 2005/0109717 A1* | 5/2005 | Armstrong | B41K 1/58 | 211/39 |
| 2005/0258059 A1* | 11/2005 | Joyce | B25H 3/003 | 206/378 |
| 2006/0000788 A1* | 1/2006 | Sholem | B25H 3/04 | 211/70.6 |
| 2006/0017841 A1* | 1/2006 | Farrell | G08B 13/19626 | 348/373 |
| 2006/0261016 A1* | 11/2006 | Magid | A47F 5/0823 | 211/57.1 |
| 2011/0006181 A1* | 1/2011 | Johnston | A47F 5/0823 | 248/220.41 |
| 2011/0254661 A1* | 10/2011 | Fawcett | G08B 13/1445 | 340/5.61 |
| 2014/0020214 A1* | 1/2014 | Ayvazian | H01F 7/0263 | 24/303 |
| 2014/0246390 A1* | 9/2014 | Dale | G09F 3/0288 | 211/59.1 |
| 2015/0041537 A1* | 2/2015 | Gentile | G06Q 10/087 | 235/385 |
| 2015/0313378 A1* | 11/2015 | Mason | F16M 13/022 | 248/205.2 |

\* cited by examiner

FIG. 15

MAGNETIC TOOL HOLDER

BACKGROUND

Field of the Invention

The present invention relates to tool holders and more particularly to a tool holder that is used in conjunction with a pegboard.

A perforated hardboard, which is popularly known as pegboard, is a tempered hardboard predrilled with evenly spaced peg holes. Pegboards are also known to be made of wood, steel, plastic, etc. In order for a pegboard to support various peggable items, especially the items such as, kitchen tools or workshop tools, pegs or hooks are secured within the peg holes whereafter, the aforementioned tools are hung thereupon. Securing pegs or hooks to a pegboard is a time-consuming process as, most of the times, the pegs or hooks are required to be secured with fasteners, such as, screws, or the like, so that, the pegs or hooks they do not come off of it. This is caused by the hooks getting stuck with the tools whereby, as the tools are disengaged from the pegboard, the hooks come off with them. Even if the inconvenience of the securing pegs and hooks is ignored for a moment, one needs to pay attention while securing certain elongate tools to the pegboard (about the pegs and hooks) as these tools require to be supported by not one, but two or more pegs or hooks.

Therefore, in the light of what is discussed, there is a need in the art for a solution in the form of a tool-supporting device, or the like, that is easily secured to a pegboard. Secondly, there is a need in the art to ease the process of securing a tool to the pegboard by providing a convenient alternative to conventional pegs or hooks.

SUMMARY

The present invention comprises a magnetic tool holder that is configured to be engaged to a pegboard. The magnetic tool holder comprises a base member comprising a top attached with a magnet and a bottom comprising a bottom planar surface. The tool holder further comprises two pairs of opposingly-disposed, spaced apart, substantially cylindrical, main legs extending through the bottom surface via thorough, substantially oblong leg holes. The base member further comprises a pair of opposingly-disposed, spring-loaded, side press buttons extending perpendicularly from opposite sides thereof. Each button is disposed in operative communication with the each main leg of the pairs of main legs whereby, pressing the buttons together, simultaneously, and inwardly into the base member causes each pair of the main legs to move towards one another from an original engagement position to a disengagement position along the length of the oblong holes. Notably, the distance between each of the at least one pair of main legs in the engagement position is greater than that of each of the at least one pair of main legs in the disengagement position. As the buttons are spring-loaded, the main legs are biased towards the engagement position.

In order to secure the tool holder to the pegboard, the buttons are simply pressed simultaneously in order to move the main legs to the disengagement position. As the main legs are in the disengagement position, they are introduced into the peg holes of the pegboard whereafter, the buttons are released causing the main legs to move back to the engagement position resulting in turn in achieving a friction fit between the peg holes and the main legs. In order to attach a tool to the pegboard, the tool is simply attached to the magnet exposed through the window.

Other objects and advantages of the embodiments herein will become readily apparent from the following detailed description taken in conjunction with the accompanying drawings.

FIGURES

Reference Numerals

10—Magnetic Tool Holder
12—Tool
14—Pegboard
16—Base Member
18—Magnet
20—Cover
22—Rectangular Slot
24—Main Leg
25—Right-angled Projection
26—Oblong Leg Hole
28—Side Press Button 30—Supporting Leg
32—Rectangular Panel
34—Central Window
36—Side Panel
38—Peg Hole
40—Tool Receptacle

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
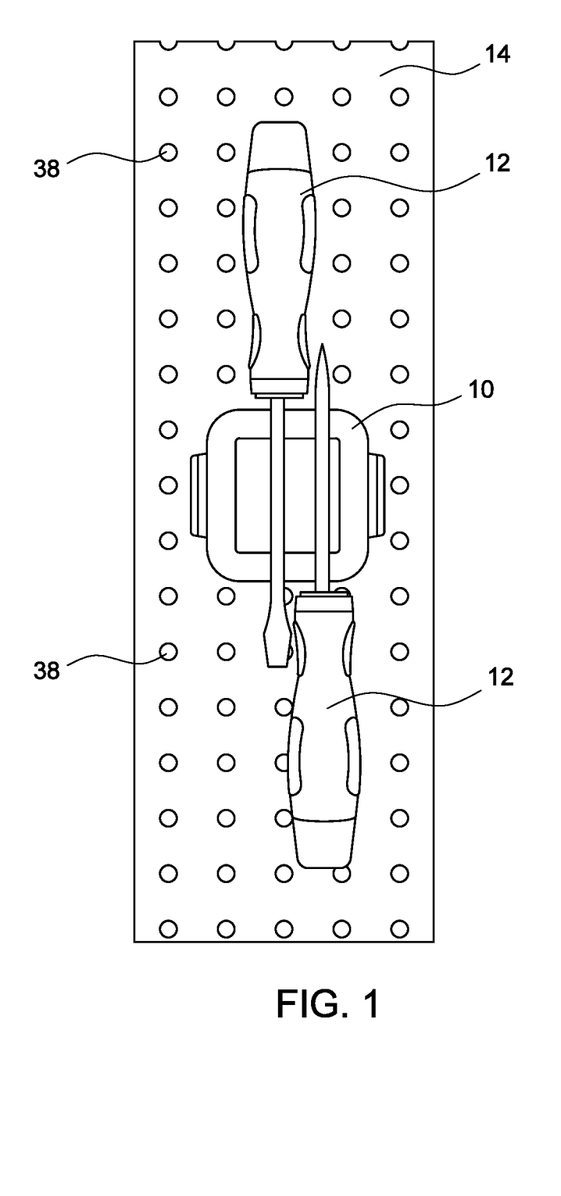
FIG. 1, according to an embodiment of the present invention, is an illustration of a tool attached to the tool holder, which in turn is engaged to a pegboard.
Figure 2:
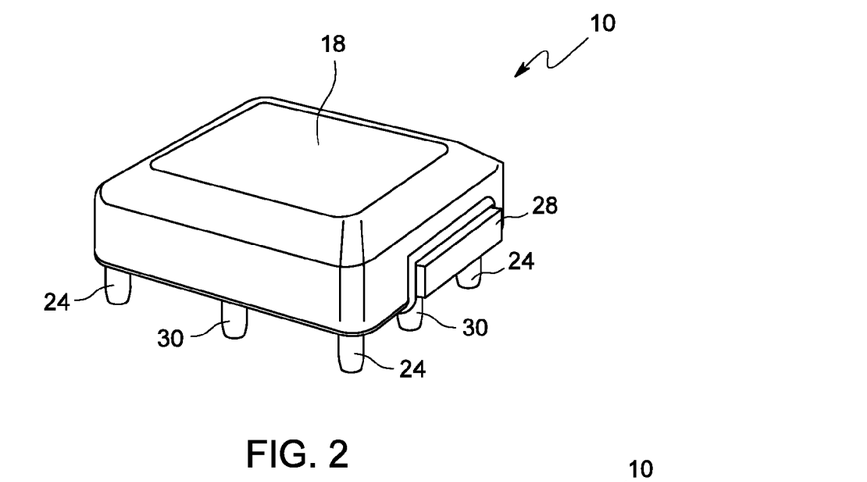
FIG. 2, according to an embodiment of the present invention, is an illustration of a perspective view of the tool holder.
Figure 3:
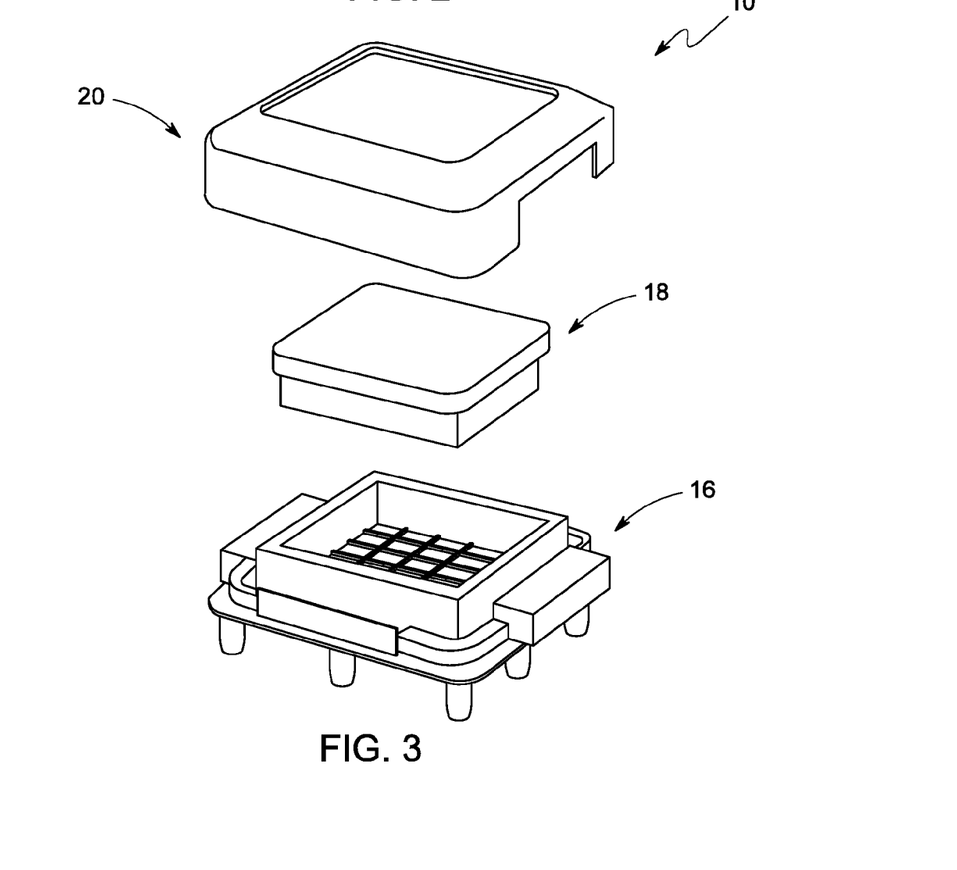
FIG. 3, according to an embodiment of the present invention, is an illustration of an exploded perspective view of the tool holder.
Figure 4:
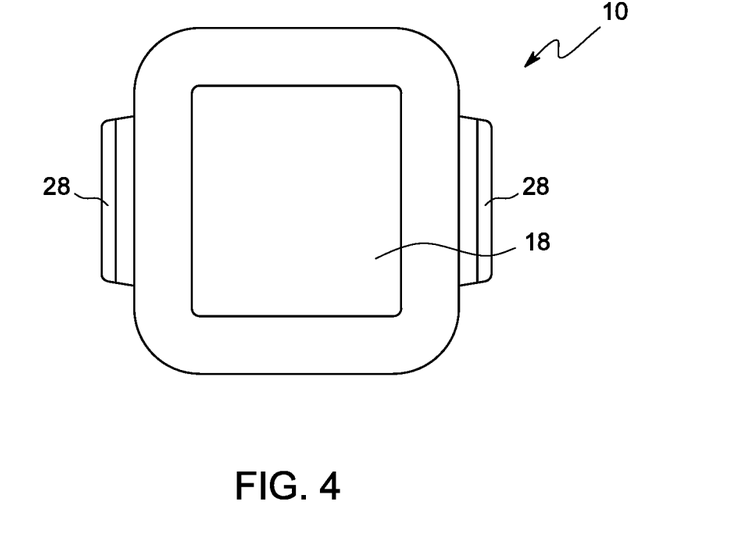
FIG. 4, according to an embodiment of the present invention, is an illustration of a top view of the tool holder.
Figure 5:
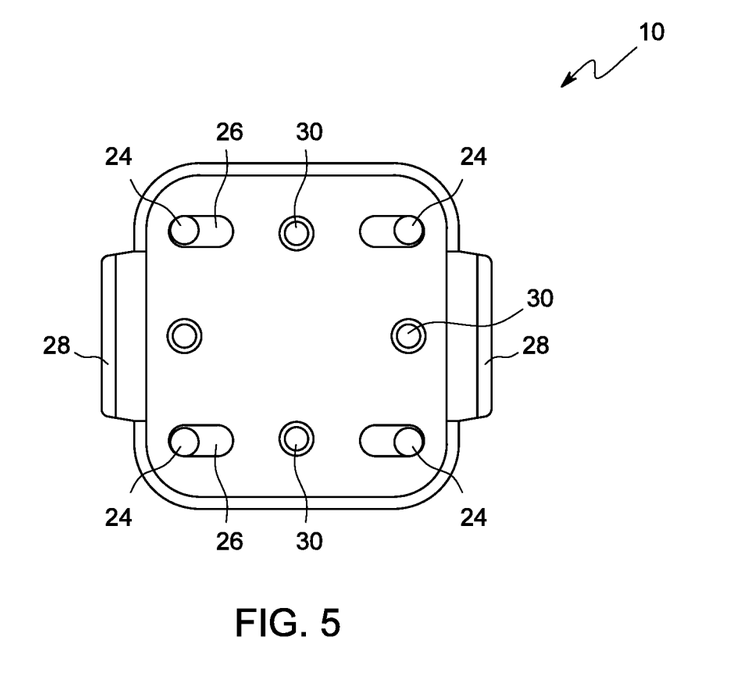
FIG. 5, according to an embodiment of the present invention, is an illustration of a bottom view of the tool holder.
Figure 6:
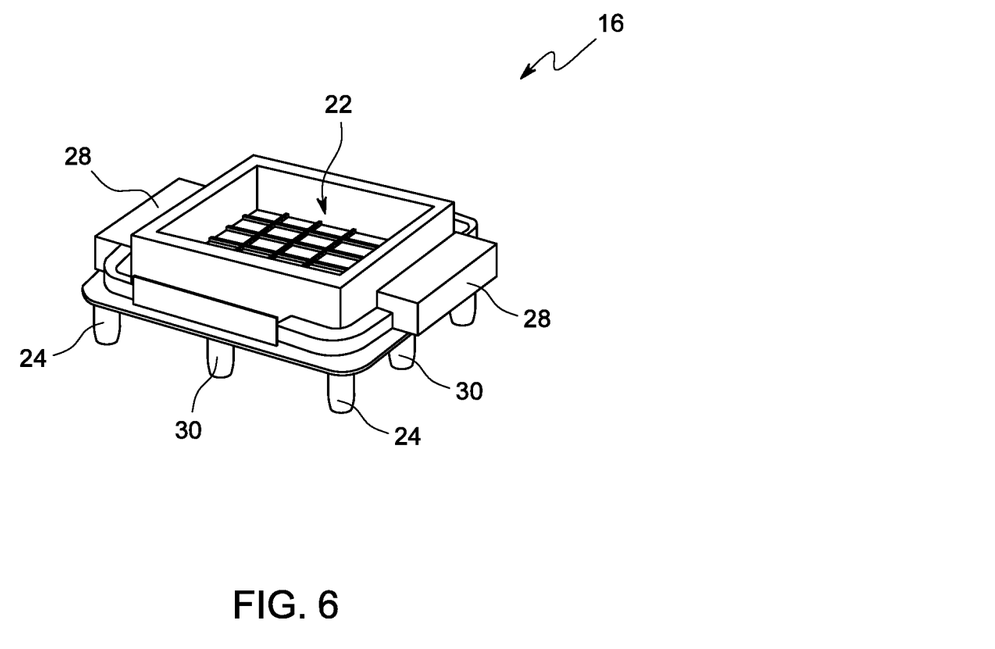
FIG. 6, according to an embodiment of the present invention, is an illustration of a perspective view of the base member.
Figure 7:
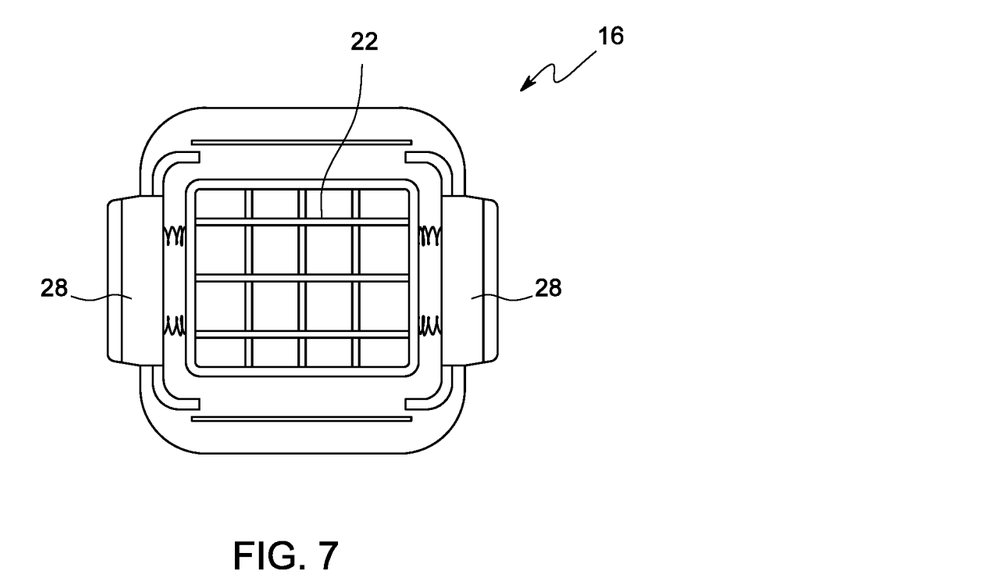
FIG. 7, according to an embodiment of the present invention, is an illustration of a top view of the base member.

Referring to FIGS. 1 through 5, the present invention comprises a rectangular magnetic tool holder 10 for attaching a magnetically-attractable tool 12 thereto. The tool holder 10 is adapted to be used in conjunction with a pegboard 14 whereby, in a way (as shown in FIG. 1), the tool 12 is attached to the pegboard 14 about the tool holder 10. The tool holder 10 comprises a rectangular base member 16, a rectangular magnet 18, and a rectangular cover 20 wherein, the relationship between each of these components will become apparent from the following body of text.

Figure 8:
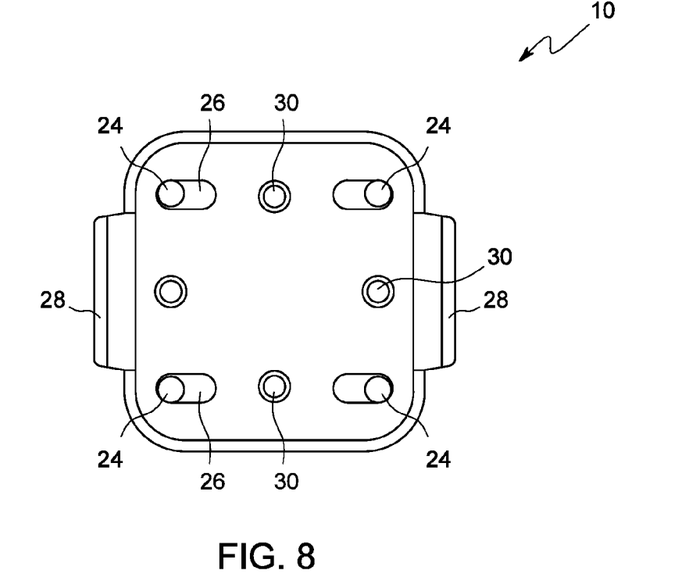
FIG. 8, according to an embodiment of the present invention, is an illustration of a bottom view of the tool holder with the main legs in the default engagement position.

Referring to FIGS. 6 through 12, the base member 16 comprises a top and a bottom wherein, the top comprises a rectangular slot 22 for receiving the magnet 18 securely therewithin and wherein, the bottom comprises a planar bottom surface. Two pairs of opposingly-disposed, spaced apart, substantially cylindrical, main legs 24 extend through the bottom surface via thorough, substantially oblong leg holes 26 disposed on the bottom surface. The base member 16 further comprises a pair of opposingly-disposed, spring-loaded, side press buttons 28 extending perpendicularly from opposite sides thereof. Each button 28 is disposed in operative communication with the a pair of main legs 24 whereby, pressing the buttons 28 together, simultaneously, and inwardly into the base member 16 causes the two pairs of the main legs 24 to move towards one another from an original engagement position (FIG. 8) to a disengagement position (FIG. 9) along the length of the oblong holes 26. Notably, the distance between each of the at least one pair of main legs 24 in the engagement position is greater than that of each of the at least one pair of main legs 24 in the disengagement position. As the buttons 28 are spring-loaded, the main legs 24 are biased towards the engagement position (FIG. 8). As can be appreciated from FIG. 10, in one embodiment, the free end of each main leg 24 comprises a slight right-angled projection 25 so as to render the main legs 24 L-shaped. Notably, the L-shaped legs 24 enable the tool holder to grip and engage the peg board 14 better. The base member 16 further comprises four, substantially cylindrical supporting legs 30 wherein, as can be appreciated from FIG. 8, each supporting leg 30 is disposed centrally between two main legs 24.

Referring to FIGS. 2, 3, 12 and 13, the cover 20 comprises a rectangular panel 32 with a central rectangular window 34 disposed thereon and four side panels 36 extending substantially perpendicularly from the four edges of the rectangular panel 32. Notably, the dimensions of the window 34 are substantially equivalent to that of the magnet 18. As the cover 20 is fitted over the base member 16 (secured with the magnet 18), the window 34 exposes the magnet 18, while the two buttons 28 extend through the side panels 36.

Figure 9:
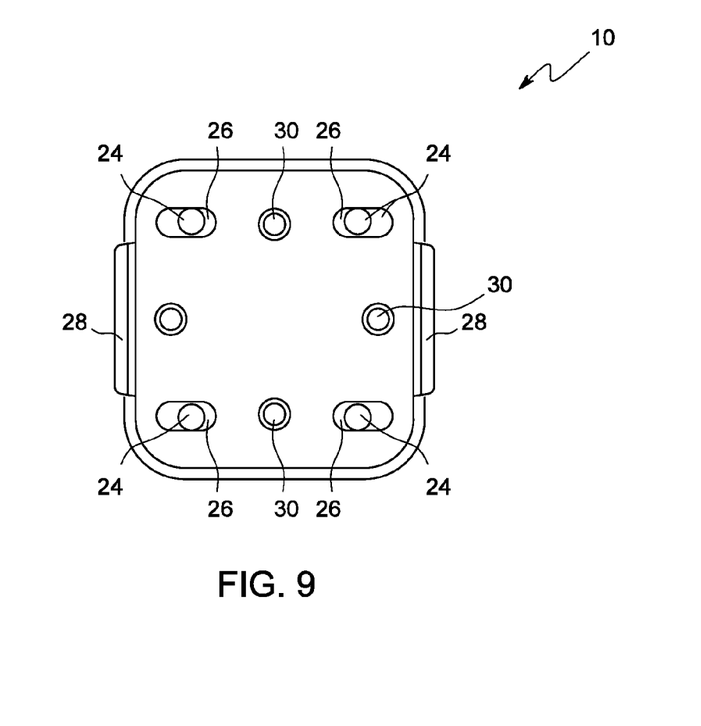
FIG. 9, according to an embodiment of the present invention, is an illustration of a bottom view of the tool holder with the main legs in the disengagement position.
Figure 10:
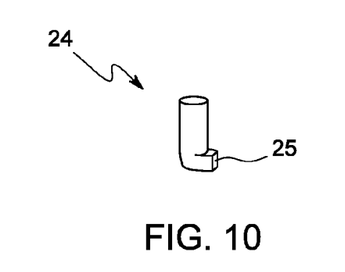
FIG. 10, according to an alternate embodiment of the present invention, is an illustration of the L-shaped main leg.
Figure 11:
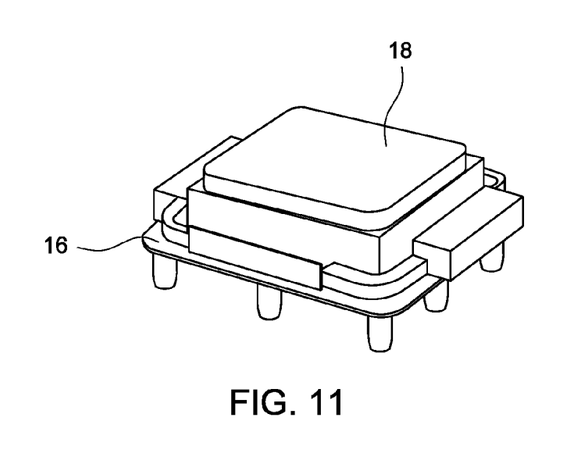
FIG. 11, according to an embodiment of the present invention, is an illustration of a perspective view of the base member attached with the magnet.
Figure 12:
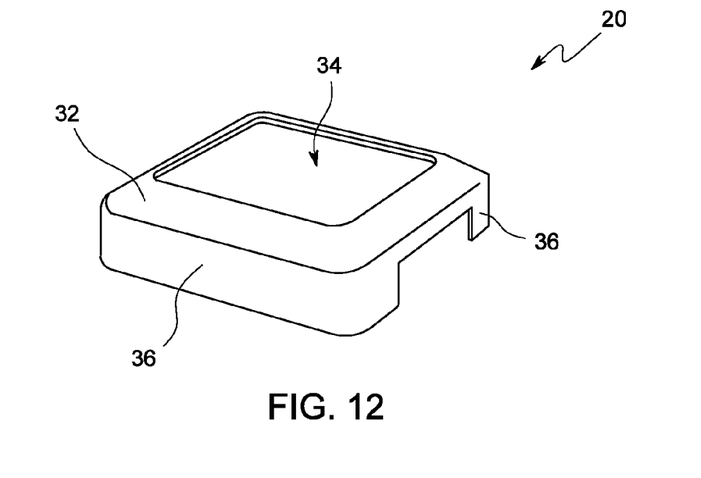
FIG. 12, according to an embodiment of the present invention, is an illustration of a perspective view of the magnet cover.
Figure 13:
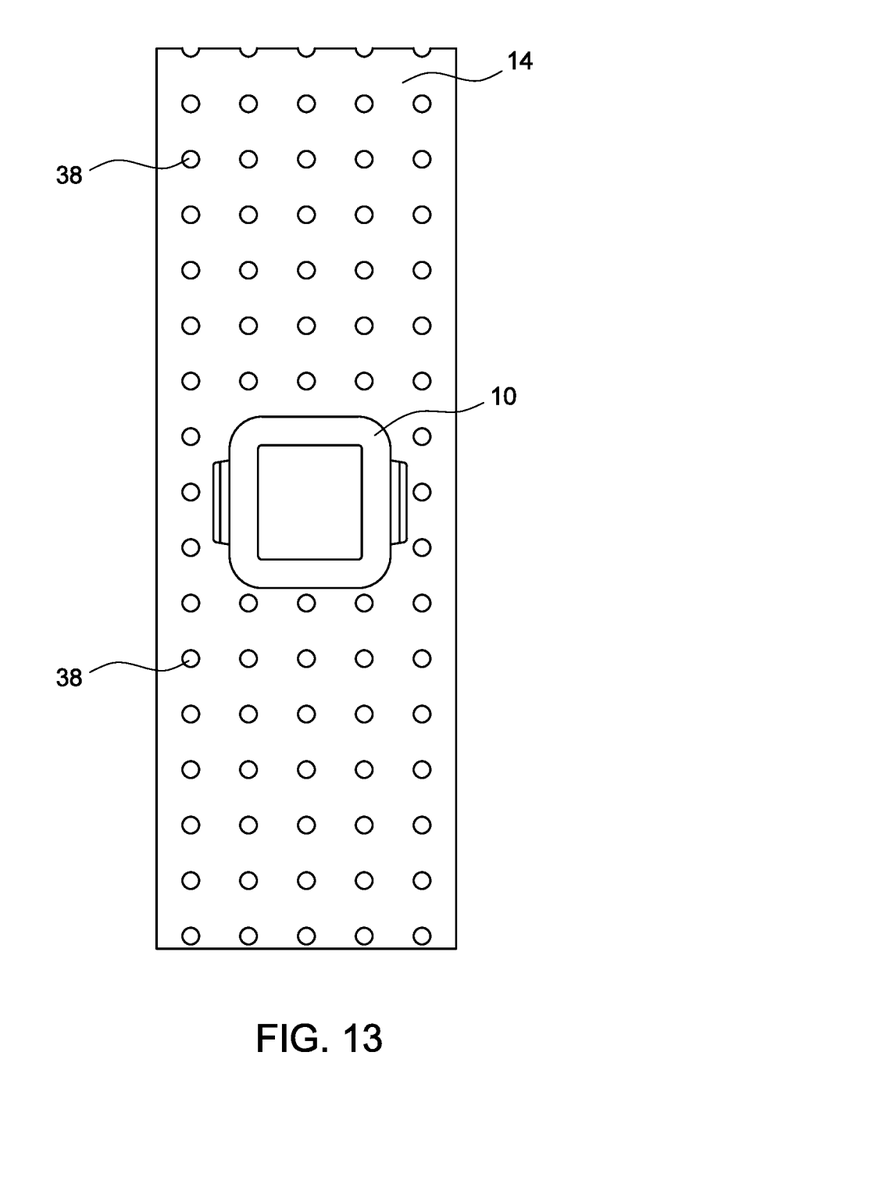
FIG. 13, according to an embodiment of the present invention, is an illustration of the tool holder attached to the pegboard.

Referring to FIGS. 1 and 13, in order to secure the tool holder 10 to the pegboard 14, the buttons 28 are simply pressed simultaneously in order to move the main legs 24 to the disengagement position (FIG. 9). As the main legs 24 are in the disengagement position (FIG. 9), they are introduced into the peg holes 38 of the pegboard 14 whereafter, the buttons 28 are released causing the main legs 24 to move back to the engagement position (FIG. 8) resulting in turn in achieving a friction fit between the peg holes 38 and the main legs 24. In order to attach a tool 12 to the pegboard 14, the tool 12 is simply attached to the magnet 18 exposed through the window 34.

Figure 14:
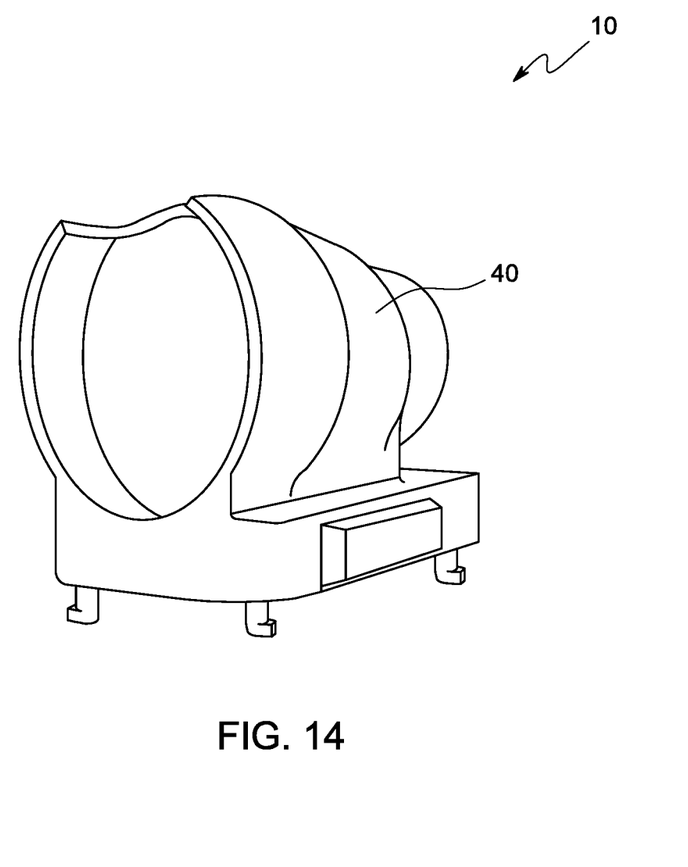
FIG. 14, according to an alternate embodiment of the present invention, is an illustration of the tool holder.
Figure 15:
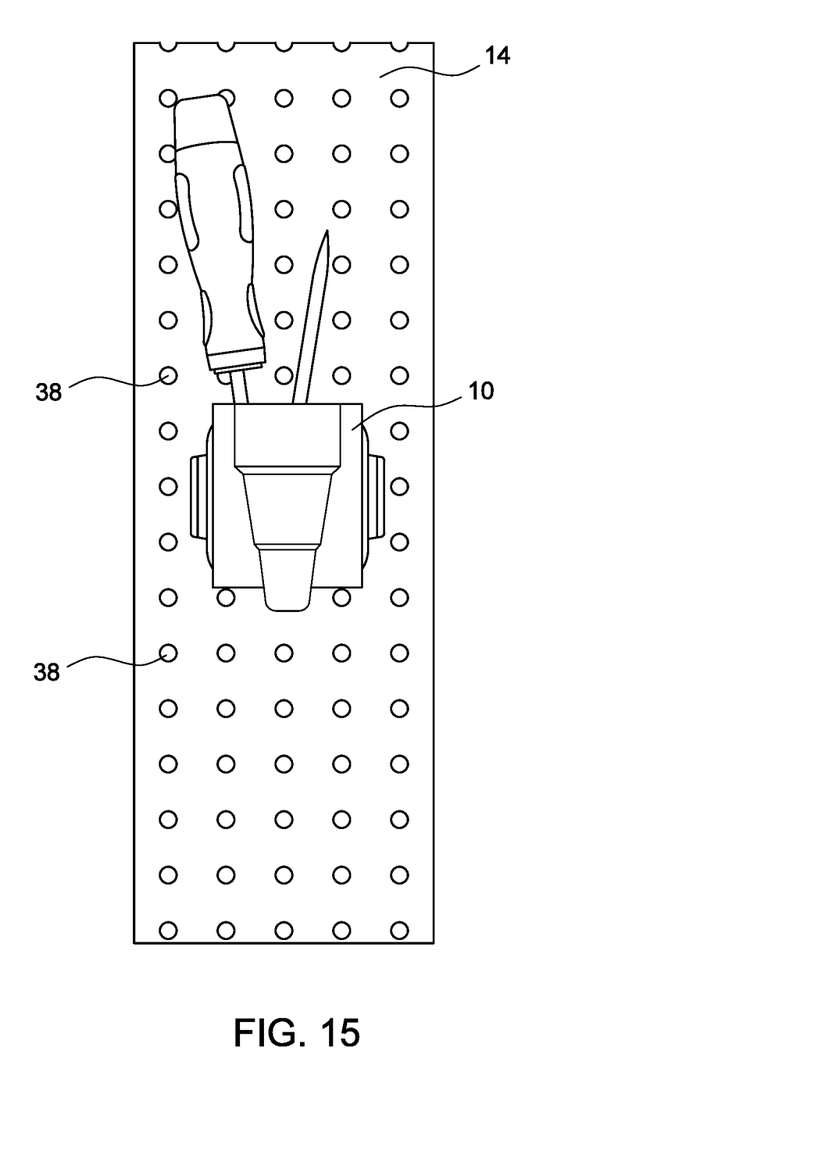
FIG. 15, according to an alternate embodiment of the present invention, is an illustration of a tool received within the tool holder, which in turn is engaged to a pegboard.

Referring to FIG. 14, in an alternate embodiment, the tool holder 10, in lieu of the magnetic arrangement, comprises a tool receptacle 40 for receiving tools therewithin. More particularly, the tool receptacle 40 is integral with the outer surface of the cover 20 whereby, when the cover 20 is secured to the base member 16, the tool receptacle 40 becomes one therewith.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. For example, the protective case assembly can be adapted to accommodate a tablet PC by simply altering the dimensions thereof. However, all such modifications are deemed to be within the scope of the claims.

What is claimed is:

1. A magnetic tool holder adapted to be used in conjunction with a pegboard, the tool holder
  comprising:
  a top surface, an opposing bottom surface, and sides, wherein a plurality of slots are formed in the bottom surface;
  at least one pair of spaced-apart, main legs extending from the bottom surface, the at least one pair of main legs are adapted to be received within the peg holes of the pegboard, each of the at least one pair of main legs are simultaneously slidably movable within corresponding slots from the plurality of slots between an engagement position and a disengagement position wherein, the distance between each of the at least one pair of main legs in the engagement position is greater than that of each of the at least one pair of main legs in the disengagement position, each of the at least one pair of main legs biased towards the engagement position, a friction fit is achieved between the pegboard and the at least one pair of main legs in the engagement position;
  a spring-loaded means for causing the at least one pair of main legs to move from the engagement position to the disengagement position, at which point, the at least one pair of main legs are no longer in contact with circumferences of the peg holes thereby enabling a disengagement from the pegboard; and a magnet disposed on the top surface of the tool holder, wherein magnetically-attractable tools are magnetically attached to the magnet.

2. The tool holder of claim 1 wherein, each of the at least one pair of main legs are opposingly-disposed.

3. The tool holder of claim 1 wherein, the at least one pair of main legs comprises two pair of opposingly-disposed legs.

4. The tool holder of claim 1, further comprising four supporting legs, each of which disposed centrally between the at least one pair of main legs; the supporting legs adapted to be snugly received within corresponding peg holes.

5. The tool holder of claim 4 wherein, the at least one pair of main legs extend through a rectangular base, while the supporting legs extend from a planar surface of the rectangular base; the spring-loaded means disposed on opposite sides of the base.

6. The tool holder of claim 1 wherein, the spring-loaded means comprises a pair of opposingly-disposed, spring-loaded press buttons, which are disposed in operative communication with the at least one pair of legs; wherein pressing the buttons together toward one another inwardly causes the at least one pair of legs to move to the disengagement position from the default engagement position.

7. The tool holder of claim 6 further comprises a cover comprising:
  (a) a rectangular panel comprising a central window within which, the surface of the magnet is exposed; and
  (b) four sides, each of which extending perpendicularly from four outer edges of the rectangular panel; wherein openings are formed in two of the four sides of the cover and the pair of buttons extend through the openings of the cover.

8. The tool holder of claim 1 wherein, the magnet is rectangular.

9. A magnetic tool holder adapted to be used in conjunction with a pegboard, the tool holder comprising:
  a to surface, an opposing bottom surface, and sides, wherein a plurality of slots are formed in the bottom surface;
  at least one pair of spaced-apart, main legs extending from the bottom surface, the at least one pair of main legs are adapted to be received within the peg holes of the pegboard, each of the at least one pair of main legs are simultaneously slidably movable within corresponding slots from the plurality of slots between an engagement position and a disengagement position wherein, the distance between each of the at least one pair of main legs in the engagement position is greater than that of each of the at least one pair of main legs in the disengagement position, each of the at least one pair of main legs biased towards the engagement position, a friction fit is achieved between the pegboard and the at least one pair of main legs in the engagement position;
  a pair of opposingly-disposed press buttons disposed in operative communication with the at least one pair of main legs whereby, pressing the buttons together toward one another inwardly causes the at least one pair of legs to move to the disengagement position from the default engagement position, at which point, the at least one pair of main legs are no longer in contact with circumferences of the peg holes thereby enabling a disengagement from the pegboard; and
  a magnet disposed on the top surface of the tool holder wherein magnetically-attractable tools are magnetically attached to the magnet.

10. A magnetic tool holder adapted to be used in conjunction with a pegboard, the tool holder comprising:
  a to surface, an opposing bottom surface, and sides, wherein a plurality of slots are formed in the bottom surface;
  two pairs of spaced-apart, main legs extending from the bottom surface, the at least one pair of main legs are adapted to be received within the peg holes of the pegboard, each pair of main legs are simultaneously slidably movable within corresponding slots from the plurality of slots between an engagement position and a disengagement position wherein, the distance between a pair of main legs in the engagement position is greater than that of the pair of main legs in the disengagement position, each pair of main legs biased towards the engagement position, a friction fit is achieved between the pegboard and the pairs of main legs in the engagement position;
  a pair of opposingly-disposed press buttons disposed in operative communication with the at least one pair of main legs whereby, pressing the buttons together toward one another inwardly causes the at least one pair of legs to move to the disengagement position from the default engagement position, at which point, the at least one pair of main legs are no longer in contact with circumferences of the peg holes thereby enabling a disengagement from the pegboard; and
  a rectangular magnet disposed on the top surface of the tool holder, wherein magnetically-attractable tools are magnetically attached to the magnet.

\* \* \* \* \*